(12) United States Patent
Mills et al.

(10) Patent No.: US 6,205,544 B1
(45) Date of Patent: Mar. 20, 2001

(54) DECOMPOSITION OF INSTRUCTIONS INTO BRANCH AND SEQUENTIAL CODE SECTIONS

(75) Inventors: Jack D. Mills, San Jose, CA (US); Christopher B. Wilkerson, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/217,762

(22) Filed: Dec. 21, 1998

(51) Int. Cl.[7] ................................................ G06F 15/00
(52) U.S. Cl. ......................... 712/230; 712/244; 712/245
(58) Field of Search ........................... 712/23, 230, 246, 712/245, 233, 244; 717/705

(56) References Cited

U.S. PATENT DOCUMENTS

| | | | |
|---|---|---|---|
| Re. 35,794 | * 5/1998 | Johnson | 712/241 |
| 4,991,080 | 2/1991 | Emma et al. | 365/200 |
| 5,485,629 | 1/1996 | Dulong | 395/800 |
| 5,588,118 | 12/1996 | Mandava et al. | 395/200.05 |
| 5,805,878 | 9/1998 | Rahman et al. | 395/586 |

FOREIGN PATENT DOCUMENTS

| | | | |
|---|---|---|---|
| 0284364 | 9/1988 | (EP) | G06F/9/38 |
| 0401992 | 12/1990 | (EP) | G06F/9/38 |
| 0463977 | 1/1992 | (EP) | G06F/9/38 |

\* cited by examiner

*Primary Examiner*—Larry D. Donaghue
(74) *Attorney, Agent, or Firm*—Schwegman, Lundberg, Woessner & Kluth, P.A.

(57) ABSTRACT

The decomposition of instructions into separate sequential and branch instruction code sections. In one embodiment, a system including a first store to store a first code section including only branch instructions and a second store to store a second code section including only sequential instructions. In another embodiment, the system also includes a processor having a first engine to process the branch instructions, and a second engine to process the sequential instructions.

10 Claims, 4 Drawing Sheets

| SOURCE | TRADITIONAL BINARY | Cflow | Dflow |
|---|---|---|---|
| A<br>if (pr1) B<br>else C<br>D | A<br>cond pr1, b<br>C<br>uncond d<br>B<br>D<br>brD | cond pr1, L(B), T, c, b<br>brD ...<br>...<br>c: uncond ,,, d | A<br>C<br>B<br>D |
| A<br>if (pr1) {<br>   B<br>   if (pr2) C<br>   else D<br>   E<br>}else{<br>   F<br>}<br>G | A<br>cond pr1, b<br>F<br>uncond g<br>B<br>cond pr2, c<br>D<br>uncond e<br>C<br>E<br>G<br>brG | cond pr1, L(B), T, f, b<br>cond pr2, L(C), T, d, c<br>brG ...<br>...<br>f: uncond ,,, g<br>...<br>d: uncond ,,, e | A<br>F<br>B<br>D<br>C<br>E<br>G |
| A<br>foo()<br>B<br>...<br>foo() {<br>W<br>if (pr1) X<br>else Y<br>Z<br>} | A<br>call br1<br>B<br>...<br>foo: W<br>cond pr1, x<br>Y<br>uncond z<br>X<br>Y<br>ret br1 | call br1<br>...<br>foo:<br>   cond pr1, L(X), T, y, x<br>   ret br1<br>y: uncond L(Z), T, 0, z<br>   ret br1 | A<br>B<br>...<br>foo:<br>W<br>Y<br>X<br>Z |
| 500 | 506 | 502 | 504 |

DECOMPOSITION OF INSTRUCTIONS INTO BRANCH AND SEQUENTIAL CODE SECTIONS

FIELD OF THE INVENTION

This invention relates generally to processor instructions, and more particularly to an architecture in which these instructions are decomposed into separate branch and sequential code sections.

BACKGROUND OF THE INVENTION

Many techniques have been introduced in processor technology to improve the execution performance of code by processors. One such category of techniques that provide simultaneous, or parallel, processing within a computer is known as pipelining. It refers to overlapping operations by moving data or instructions into a conceptual pipe with all stages of the pipe processing simultaneously. For example, while one instruction is being executed, the computer is decoding the next instruction.

With techniques such as pipelining, an issue that can affect performance is the treatment of branches within code. For example, when an execution engine of a processor reaches a branch instruction within the code, it must decide whether to stop all processing until that branch has been evaluated, or continue on one path or another of the branch. Such issues have been resolved to some extent by various techniques called branch prediction. In branch prediction, a given path of the prediction is initially executed in a speculative manner, until it can be determined that the particular path is indeed the correct path. If it is, processing can continue; otherwise, however, the initial execution is wasted.

Thus, during the execution of a program, the execution engine is rarely surprised by the arrival at a branch. However, once a basic block of code is entered, every instruction in that basic block is enabled for execution. Unfortunately, since branches tend to exist at the bottom of basic blocks, the engine must fetch all intervening sequential (that is, non-branch) instructions before encountering the branch.

One particular type of branch prediction involves the insertion of additional hint instructions in the basic block of code. These additional instructions are problematic, however.

The latency at which these instructions take effect, for example, may vary with the execution engine such that their position in the code should vary also. For these and other reasons, there is a need for the present invention.

SUMMARY OF THE INVENTION

The invention provides for the decomposition of instructions into separate sequential and branch instruction code sections. In one embodiment, a system includes a first store to store a first code section including only branch instructions, and a second store to store a second code section including only sequential instructions. In another embodiment, the system also includes a processor having a first engine to process the branch instructions, and a second engine to process the sequential instructions.

DETAILED DESCRIPTION

In the following detailed description of exemplary embodiments of the invention, reference is made to the accompanying drawings which form a part hereof, and in which is shown by way of illustration specific exemplary embodiments in which the invention may be practiced. These embodiments are described in sufficient detail to enable those skilled in the art to practice the invention, and it is to be understood that other embodiments may be utilized and that logical, mechanical, electrical and other changes may be made without departing from the spirit or scope of the present invention. The following detailed description is, therefore, not to be taken in a limiting sense, and the scope of the present invention is defined only by the appended claims.

Some portions of the detailed descriptions which follow are presented in terms of algorithms and symbolic representations of operations on data within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like. It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Figure 1:
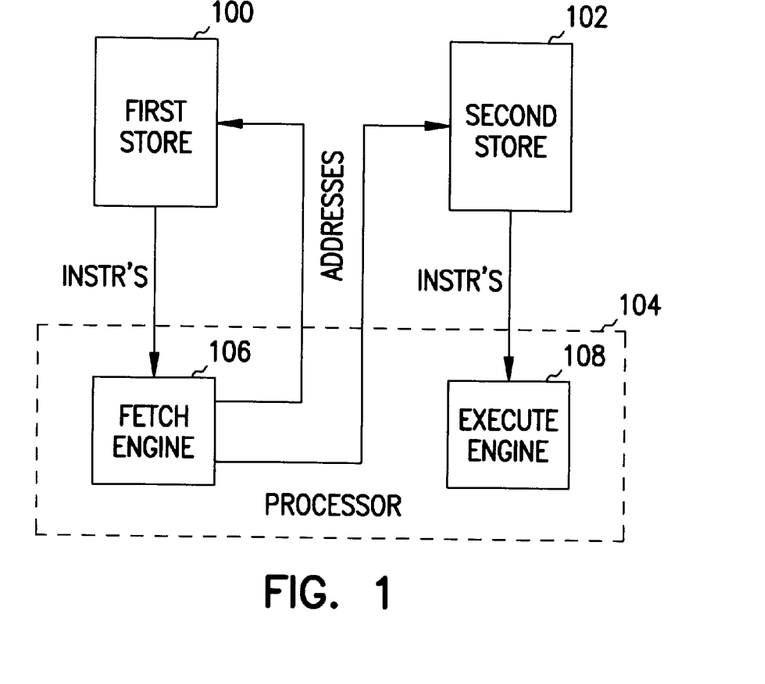
FIG. 1 shows a diagram of a system according to one embodiment of the invention.

Referring first to FIG. 1, a system according to an embodiment of the invention is shown. The system includes a first store 100, a second store 102, and a processor 104. The system operates with respect to code comprising instructions. The instructions are of two types: branch instructions, which cause the processor 104 to branch to a non-sequential position in the code, and sequential instructions, which are non-branch instructions. The code referred to in this application in accordance with one embodiment of the invention is object or machine code, of the type that is directly understandable and executable by the processor 104. Such code may be generated, for example, by a compiler that compiles source code written in pseudo-English and relatively understandable by programmers to a first code section including only branch instructions and a second code section including only sequential instructions, where both code sections are object or machine code.

Each of the first store 100 and the second store 102 can in one embodiment be a memory, such as a dynamic random access memory (DRAM), or a cache memory (on-processor, or level-one cache, or off-processor, or level-two cache), etc., which are addressable by addresses. The first and the second stores 100 and 102 together store the first and the second code sections that make up a given basic block of code. For example, the given basic block of code may be the amount of code that is fetched at one time for processing by the processor 104, although the invention is not so limited. More generally, a basic block is a sequence of consecutive statements in which flow of control enters at the beginning and leaves at the end without halt or possibility of branching except at the end. A sequence of instructions with no intervening branches or targets, therefore, is a basic block. The first section of code relates to the second section in that the branch instructions of the first section are the branch instructions for the given block of code, while the sequential instructions of the second section are the sequential instructions for the given block of code.

The processor 104 includes two engines, a first (or fetch) engine 106 and a second (or execute) engine 106. The first engine 106 is used to process the branch instructions retrieved from the first store 100. Based on the branch instructions, the second engine 108 is used to process sequential instructions retrieved from the second store 102. The separation of code into two separate sections, such that separate engines of the processor 104 are used to process only specific types of instructions, is an important aspect in at least one embodiment of the invention. That is, the decoupling of the two sections of code mirrors the decoupling of the two primary engines in a processor, the fetch engine and thee execution engine. The branch instruction code section becomes the "program" for the fetch engine, and the sequential instruction code section becomes the "program" for the execution engine.

This decoupling thus enables the fetch engine to run ahead of the execution engine since it does not need to wade through the sequential instructions in a basic block of code in order to find the next branch. By running ahead of the execution engine, the fetch engine can hide some or all of the latencies associated with misses of branch predictors, which include Branch Target Buffers (BTB) and other structures used to predict the outcome of a branch; branch prediction latency; instruction and cache misses; etc.

Furthermore, those of ordinary skill within the art can appreciate that the decomposition of branch and sequential instructions has many implications that is conducive to higher performance processing. For example, because branch instructions and sequential instructions are no longer intermixed they can have different formats. This allows branch instructions to contain additional useful information not found in traditional branch instructions, such as basic block length, which can be used to control prefetching, as known in the art. Furthermore, because there are no intervening sequential instructions in the branch instructions code section, branches can be defined such that the next sequential branch can be along the taken path. This enables branches along a frequently executed path to be sequentially contiguous in memory, thus making the branch instruction stream much more well behaved. In addition, the decomposition under the invention enables the compiler to make control flow optimizations, as those of ordinary skill within the art can appreciate, such as tail duplication, without incurring additional code size due to replicated sequential instructions. Rather, control flow optimizations can be implemented easily by replicating branches.

However, those of ordinary skill within the art can recognize that decomposition may in at least some embodiments require the addition of a target address within a branch instruction pointing to a subsequent branch in the first (branch) section of code, as well as to a target address to a target sequential instruction in the second (sequential) section of code. In at least some embodiments of the invention, if only direct branches exist, no indication of branch position is needed in to the second (sequential) section of code—instead only a basic block length field in each branch would indicate when to transition to the sequential instruction stream to a subsequent basic block. However, in at least some embodiments indirect branches do not know the length of their target basic block, such that some indication of basic block boundaries is necessary within the second (sequential) section of code. To solve this problem, one embodiment of the invention utilizes boundary bits, or B-bits, as known within the art, for this purpose. Thus, any number of branches can be chained together to implement a multiway branch—that is, a single B-bit can cause advancement within the first (branch) section of code by multiple branch instructions, as can be appreciated by those of ordinary skill within the art.

Finally, the decomposition in accordance with at least some embodiments of the invention means that performance of a given section of code is no longer dependent on the presence of branch hints. This is an advantage of these embodiments of the invention. Branch hints are generally not scalable since their usefulness is dependent on front end micro-architectural (that is, processor architecture-related) latencies; running the same code on a micro-architecture with different front end latencies may, for example, invalidate the benefit of the specific branch hints. Conversely, the decomposition in accordance with at least some embodiments of the invention increases scalability by allowing the micro-architecture, not the compiler, to decide how far ahead to "execute" in the first (branch) section of code, in order to decrease front-end micro-architecture latencies.

Still referring to FIG. 1, the decomposition of branch and sequential instruction requires in at least some embodiments of the invention modification of various pointers and registers as generally commonly exist in the processors such as the processor 104. First, the processor 104 in one embodiment includes a store, to store a first instruction pointer pointing to a current sequential instruction within the second code section 102, and a second instruction pointer pointing to a current branch instruction within the first code section 100. This is as opposed to a processor within the prior art, that may have only one instruction pointer.

Next, in one embodiment the processor 104 includes a register that also has separate instruction pointers for each of a sequential instruction and a branch instruction. For example, the register may be to store a first instruction pointer pointing to a sequential instruction within the second code section 102 and a second instruction pointer pointing to a branch instruction within the first code section 100. Thus, if a conventional processor has a 32-bit register for an instruction pointer, the processor 104 would have a 64-bit register for a 32-bit branch instruction pointer and a 32-bit sequential instruction pointer.

Similarly, in one embodiment of the invention the processor 104 includes a store for the return to a point in each of the first and the second code sections after an interrupt has caused the engines of the processor 104 to move from the current points. For example, the store may store a first interrupt instruction pointer pointing to a sequential instruction within the second code section 102, and a second interrupt instruction pointer pointing to a branch instruction within the first code section 100. This is as compared with a prior art processor, that may have only a single interrupt instruction pointer.

Figure 2:
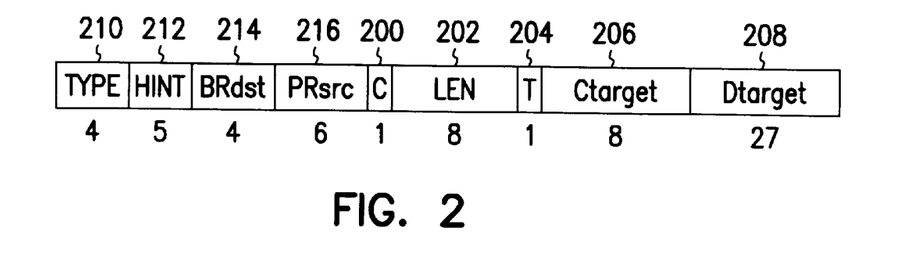
FIG. 2 shows a diagram of a branch instruction according to one embodiment of the invention.

Referring next to FIG. 2, a diagram of a branch instruction according to one embodiment of the invention is shown. The branch instruction of FIG. 2 is 64 bits in length. The branch instruction includes four additional fields beyond those ordinarily found in prior art processors; the additional fields provide for additional functionality that is useful due to the decomposition of sequential and branch instructions. The additional fields are: C field 200, len field 202, T field 204 and the existence of two target fields 206 and 208 (as opposed to just one target field as found in prior art processors).

The C field 200 is 1 bit in length, and indicates whether the next branch should be changed into the same B-bit, as known within the art, as the present branch. This provides for the implementation of multiway branches of any length, as those of ordinary skill within the art can appreciate. That is, the C field 200 indicates whether to chain the next sequential branch into the same B-bit (that is, into an identical bundling bit). The len field 202 is 8 bits in length, and provides a hint as to the length of the target basic block of code (specified by the target pointer 208), in units of bundles and/or slots. Thus, the purpose of the len field 202 is to control instruction prefetching from the second sequential cod section.

The T field 204 is 1 bit in length, and specifies whether the next sequential branch in the first branch code section is down the taken or the not taken path of the present (current) branch. This allows the branches in an arbitrary path to be sequential in memory. Finally, as has been described, because branches and sequential instructions are not intermixed in the same code section, in addition to a tradition target field pointing to a next basic block of (sequential) code 208 (the field 208 thus specifying an address of a next sequential instruction relative to a current sequential instruction), the code 208 being 27 bits in length, there is another target field 206. The target field 206 points to an address of a next branch instruction relative to the current branch instruction, and is 8 bits in length. The value of the field 206 is added to the present address into the first branch code section to generate a target within the branch code section.

It is noted that in at least some embodiments of the invention, for direct calls the value of the len field 202 is not known by the compiler in general, but is known by the linker. For indirect branches, calls, etc., the value of the "len" field is not known by the compiler or the linker. In these situations, the len field 202 may be ignored, redefined to a more useful function, or left as is to support dynamic behavior, as those of ordinary skill within the art can appreciate.

Finally, the branch instruction of FIG. 2 includes more traditional fields as normally found in branch instructions. These include: a 4-bit type field 210 to specify a type of the branch instruction (indirect, direct, etc.); a 5-bit hint field 212 to specify a hint for the branch instruction, as known within the art; a 4-bit Brdst field 214 specifying a branch register destination for calls, as known within the art, and, a 6-bit Prsrc field 216 specifying a predicate source for conditionals.

Figure 3:
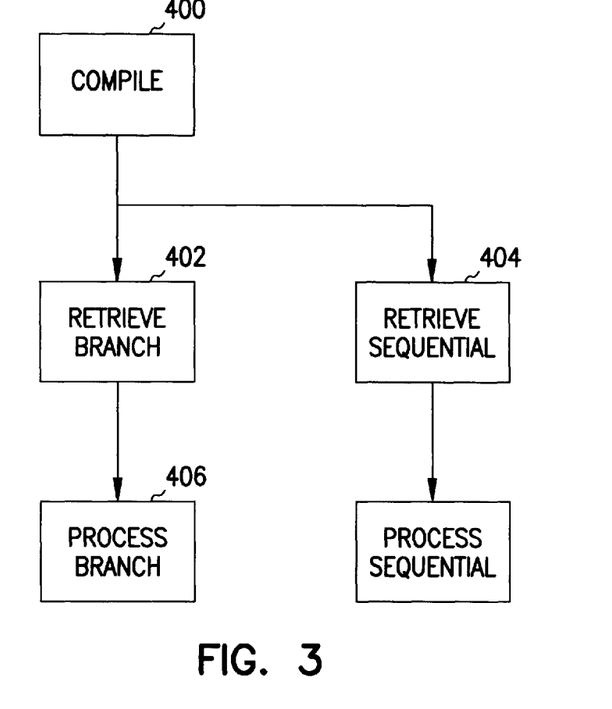
FIG. 3 shows a flowchart of a method according to an embodiment of the invention.

Referring next to FIG. 3, a method according to an embodiment of the invention is shown. The method is desirably realized at least in part as one or more programs running on a computer—that is, as a program executed from a computer-readable medium such as a memory by a processor of a computer. The programs are desirably storable on a computer (or machine)-readable medium such as a floppy disk or a CD-ROM, for distribution and installation and execution on another computer. Each program desirably includes machine-executable instructions, as known within the art. The method of FIG. 3 may be implemented in conjunction with the embodiments of FIG. 1 and FIG. 2 (that is, a system according to FIG. 1 having branch instructions according to FIG. 2), although the invention itself is not so limited.

The method of FIG. 3 illustrates one example by which a system or processor according to an embodiment of the invention (such as that shown in FIG. 1) may operate. The example is a rudimentary example, not meant to have necessarily any real-world value, but to illustrate the mainer in which at least one embodiment of the invention can operate. Thus, in 400, a source code is compiled into a first code section including only branch instructions and a second code section including only sequential instructions. In 402, a branch instruction is retrieved from the first code section, and in 404, a sequential instruction is retrieved from the second code section, where 402 and 404 may be performed independently of one another. Finally, in 406, the retrieved branch instruction is processed, and in 408, the retrieved sequential instruction is processed, where 406 and 406 may be performed independently of one another.

Thus, the method of FIG. 3 in accordance with at least some embodiments of the invention contemplates a processor that is able to independently process the branch instructions (fetch) and the sequential instructions (execute), although this is not necessarily the case in all embodiments. The method of FIG. 3 in 400 decomposes the branch instructions and the sequential instructions in separate code sections, providing for performance advantages as has been already described.

Those of ordinary skill within the art can appreciate that the decomposition accomplished by at least some embodiments of the invention may require micro-architectural considerations. For example, it is expected that instruction and sequential instructions in at least some embodiments will be cached in separate structures, such that the instruction cache replaces the traditional branch predictors, which include Branch Target Buffers (BTB) and other structures used to predict the outcome of a branch. This cache can be augmented with additional fields, such as branch history or target addresses for indirect branches. Since it is generally expected that the fetch engine, which is generating target addresses within the sequential code section, will run ahead of the execution engine, which is executing the sequential instructions, a first-in-first-out (FIFO) buffer may be required between the fetch and the execute engines in the processor. Entries are thus pushed into the bottom of the FIFO buffer by the branch logic, and the top entry is popped by the sequential logic upon encountering a B-bit; thus, the len field can be used as a prediction for the position of the next B-bit. Furthermore, in the same clock cycle in which a new sequential target is placed into the buffer, the tags for the sequential instruction cache can be checked to determine if the target will miss; if so, then a prefetch can be initiated—thus overlapping sequential instruction miss latency.

Furthermore, those of ordinary skill within the art can appreciate that the decomposition accomplished by at least some embodiments of the invention may require compiler considerations. For example, the compiler should attempt to structure the first (branch) code section such that consecutive dynamic branches along frequent paths are sequential—path profiling, as known in the art, can be used to identify the most frequent paths. Given that the downside costs, in terms of increased code size, of such control flow optimizations as tail duplication are dramatically reduced by the decomposition performed in accordance with at least some embodiments of the invention, the compiler can thus make more aggressive use of these types of optimizations.

Figure 4:
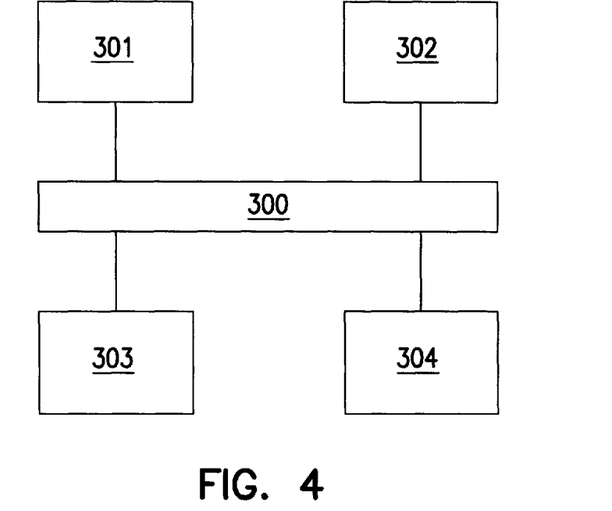
FIG. 4 shows a diagram of a computer in conjunction with which embodiments of the invention may be practiced.

Referring next to FIG. 4, a diagram of a computer in conjunction with which embodiments of the invention may be practiced is shown. The computer comprises bus 300, keyboard interface 301, external memory 302, mass storage device 303 and processor 304. Bus 300 can be a single bus or a combination of multiple buses. Bus 300 can also comprise combinations of any buses. Bus 300 provides communication links between components in the computer. Keyboard controller 301 can be a dedicated device or can reside in another device such as a bus controller or other controller. Keyboard controller 301 allows coupling of a keyboard to the computer system and transmits signals from a keyboard to the computer system. External memory 302 can comprise a dynamic random access memory (DRAM) device, a static random access memory (SRAM) device, or other memory devices. External memory 302 stores information from mass storage device 303 and processor 304 for use by processor 304. Mass storage device 303 can be a hard disk drive, a floppy disk drive, a CD-ROM device, or a flash memory device. Mass storage device 304 provides information to external memory 302. Processor 304 can be a microprocessor and may be capable of decoding and executing a computer program such as an application program or operating system with instructions from multiple instruction sets.

Figure 5:
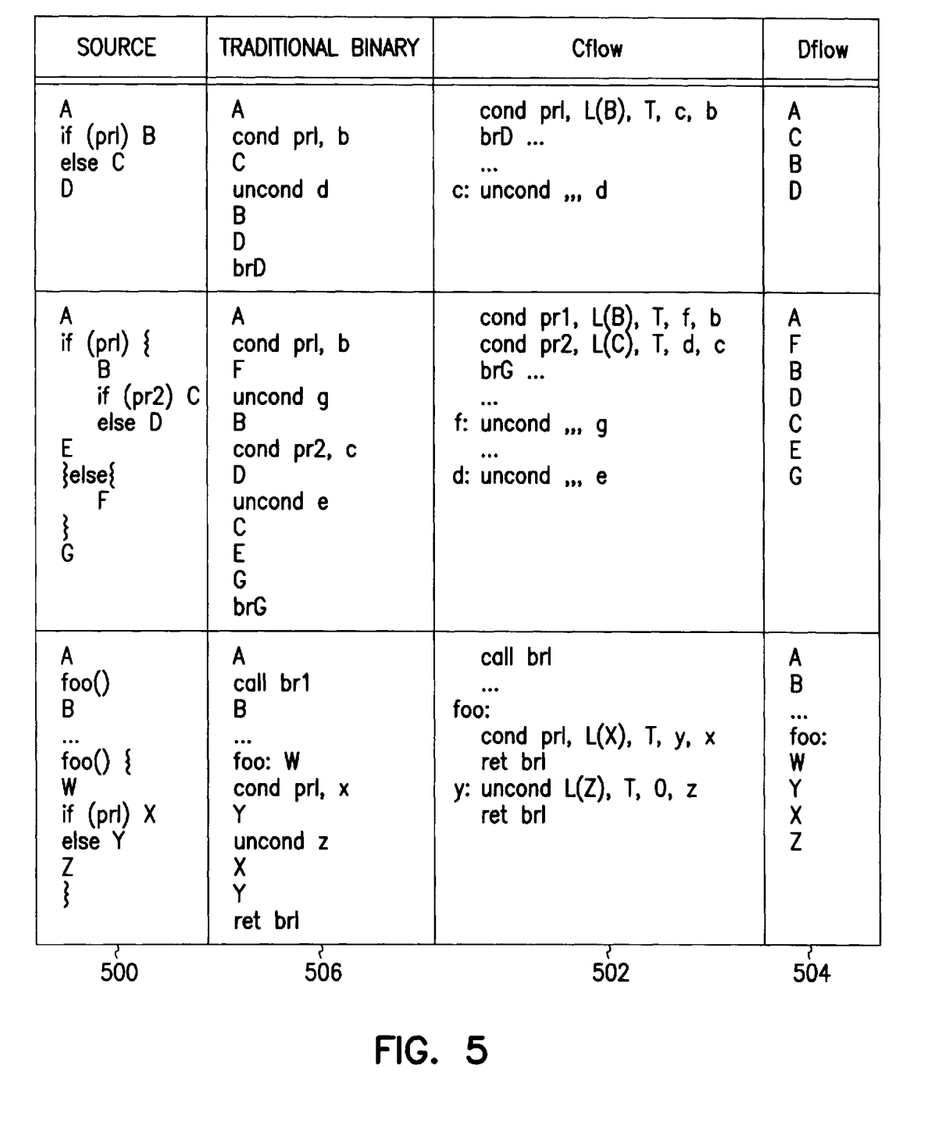
FIG. 5 shows a diagram showing decomposition of code into separate branch and sequential instruction code sections, as compared to a more traditional single code section, in accordance with an embodiment of the invention; and, FIG. 6 shows a diagram showing a performance comparison of a traditional branch architecture as compared to a branch architecture utilizing decomposition, according to an embodiment of the invention.

Referring next to FIG. 5, a diagram showing decomposition of code into separate branch and sequential instruction code sections, as compared to a more traditional single code section, in accordance with an embodiment of the invention, is shown. Thus, the source code in column 500 is compiled into two separate sections of machine code, one for branch instructions and one for sequential instructions, as shown in columns 502 and 504, respectively. This is as compared to compiling of the source code into a more traditional single machine code section, as shown in column 506.

Figure 6:
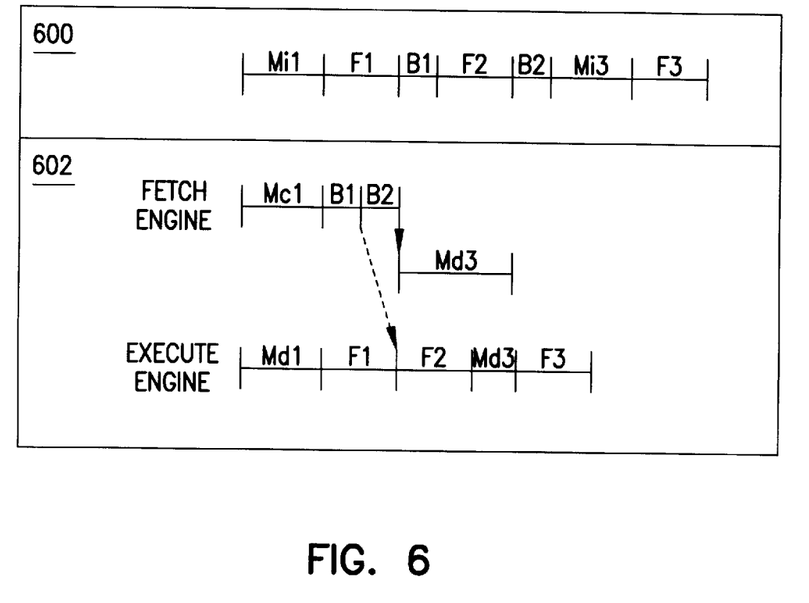

Referring finally to FIG. 6, a diagram showing a performance comparison of a traditional branch architecture as compared to a branch architecture utilizing decomposition, according to an embodiment of the invention, is shown. The latency nomenclature used in FIG. 6 is as follows: Mi refers to an instruction cache miss; Mc refers to a branch instruction cache miss; Md refers to a sequential instruction cache miss; F refers to a basic block fetch; and, B refers to a branch prediction. A traditional branch architecture, as indicated by 600, is compared to a branch architecture having decomposition in accordance with an embodiment of the invention, as indicated by 602. Activity at the output of the fetch engine in 602 is such that this output may connect directly to the input of the execution engine or to the input of a decoupling buffer. In a traditional architecture in 600, front-end latencies occur sequentially one after another. Thus, the architecture having decomposition allows branch instruction cache miss latency, sequential instruction cache miss latency, and branch prediction latency to overlap sequential instruction fetch, providing for better performance.

Decomposition of instructions into separate sections of branch and sequential instructions has been described. Although specific embodiments have been illustrated and described herein, it will be appreciated by those of ordinary skill in the art that any arrangement which is calculated to achieve the same purpose may be substituted for the specific embodiments shown. This application is intended to cover any adaptations or variations of the present invention. Therefore, it is manifestly intended that this invention be limited only by the following claims and equivalents thereof.

We claim:

1. A system comprising:
   a first store to store a first code section including only branch instructions;
   a second store to store a second code section including only sequential instructions; and
   a processor comprising:
      a first engine to process the branch instructions of the first code section,
      a second engine to process the sequential instructions of the second code section, and
      a store to store a first interrupt instruction pointer pointing to a sequential instruction within the second code section and a second interrupt instruction pointer pointing to a branch instruction within the first code section.

2. The system of claim 1, wherein each branch instriction comprises:
   a first data field specifying an address of a next branch instruction relative to the branch instruction; and,
   a second data field specifying an address of a next sequential instruction relative to a current sequential instruction.

3. The system of claim 2, wherein each branch instruction further comprises:
   a third data field specifying a type of the branch instruction;
   a fourth data field specifying a hint for the branch instruction;
   a fifth data field specifying a branch register destination for calls; and,
   a sixth data field specifying a predicate source for conditionals.

4. The system of claim 2, wherein each branch instruction further comprises:
   a third data field indicating whether to chain a next sequential branch in an identical bundling bit;
   a fourth data field indicating a length of a basic block of code; and,
   a fifth data field indicating whether a next sequential branch is on a taken path of a current branch.

5. A processor comprising:
   a first engine to process branch instructions of a first code section including only branch instructions, as retrieved from a first store storing only the first code section;
   a second engine to process sequential instructions of a second code section including only sequential instructions, as retrieved from a second store storing only the second code section; and a store to store a first interrupt instruction pointer pointing to a sequential instruction within the second code section and a second interrupt instruction pointer pointing to a branch instruction within the first code section.

6. The processor of claim 5, wherein each branch instruction comprises:
- a first data field specifying an address of a next branch instruction relative to the branch instruction; and,
- a second data field specifying an address of a next sequential instruction relative to a current sequential instruction.

7. A method comprising compiling a source code into a first code section including only branch instructions and a second code section including only sequential instructions;

processing the branch instructions of the first code section by a first processor engine;

processing the sequential instructions of the second code section by a second processor engine;

storing in a processor store a first interrupt instruction pointer pointing to a sequential instruction within the second code section; and storing in the processor store a second interrupt instruction pointer pointing to a branch instruction within the first code section.

8. The method of claim 7, wherein each branch instruction comprises:
- a first data field specifying an address of a next branch instruction relative to the branch instruction; and
- a second data field specifying an address of a next sequential instruction relative to a current sequential instruction.

9. The method of claim 8, wherein each branch instruction further comprises:
- a third data field specifying a type of the branch instruction;
- a fourth data field specifying a hint for the branch instruction;
- a fifth data field specifying a branch register destination for calls; and
- a sixth data field specifying a predicate source for conditionals.

10. The method of claim 8, wherein each branch instruction further comprises:
- a third data field indicating whether to chain a next sequential branch in an identical bundling bit;
- a fourth data field indicating a length of a basic block of code; and
- a fifth data field indicating whether a next sequential branch is on a taken path of a current branch.

* * * * *

UNITED STATES PATENT AND TRADEMARK OFFICE
CERTIFICATE OF CORRECTION

PATENT NO. : 6,205,544 B1
DATED : March 20, 2001
INVENTOR(S) : Mills et al.

It is certified that error appears in the above-identified patent and that said Letters Patent is hereby corrected as shown below:

Column 6,
Line 27, delete "mainer" and insert -- manner --, therefor.

Signed and Sealed this

Twelfth Day of March, 2002

Attest:

JAMES E. ROGAN
Attesting Officer
Director of the United States Patent and Trademark Office